United States Patent [19]

Lee

[11] Patent Number: 5,353,123
[45] Date of Patent: Oct. 4, 1994

[54] APPARATUS FOR PROCESSING STILL PICTURE IN VIDEO LASER DISC PLAYER

[75] Inventor: Ui W. Lee, Seoul, Rep. of Korea

[73] Assignee: Goldstar Co., Ltd., Seoul, Rep. of Korea

[21] Appl. No.: 101,193

[22] Filed: Aug. 3, 1993

[30] Foreign Application Priority Data

Aug. 3, 1992 [KR] Rep. of Korea ............... 13946/1992

[51] Int. Cl.$^5$ ..................... H04N 9/79; H04N 5/92
[52] U.S. Cl. ..................... 358/322; 358/312; 358/313; 358/342; 358/326; 358/310
[58] Field of Search ............... 358/322, 326, 320, 324, 358/310, 312, 313, 319, 335, 342, 337; 360/33.1, 35.1; H04N 9/79, 9/80, 5/92

[56] References Cited

U.S. PATENT DOCUMENTS

| | | | |
|---|---|---|---|
| 4,894,732 | 1/1990 | Ueda | 358/342 |
| 5,097,346 | 3/1992 | Kawakami | 358/342 |
| 5,130,858 | 7/1992 | Ebara et al. | 358/342 |
| 5,136,395 | 8/1992 | Ishii et al. | 358/335 |

Primary Examiner—Tommy P. Chin
Assistant Examiner—Khoi Truong
Attorney, Agent, or Firm—John P. White

[57] ABSTRACT

An apparatus for processing a still picture in a video laser disc player, comprising a memory store interval control section for outputting a memory store interval control signal in response to field and field reference signals from a field separation section, an external still picture signal and an even field designating signal, a memory control section responsive to the memory store interval control signal for outputting an address increment signal and a self-horizontal synchronization signal and outputting a chip enable signal, a write/read select signal and a write enable signal to a video memory, a memory address generation section for outputting a write or read address signal to the video memory, the even field designating signal to the memory store interval control section and a color burst phase correcting signal in the still picture mode in response to the address increment signal and the self-horizontal synchronization signal, and a video signal processing section responsive to the color burst phase correcting signal and an external video switching signal for, in the still picture mode, outputting an input video signal from a laser disc as a memory output video signal to the video memory and processing an input video signal of one field from the video memory as a video signal of one frame.

6 Claims, 15 Drawing Sheets

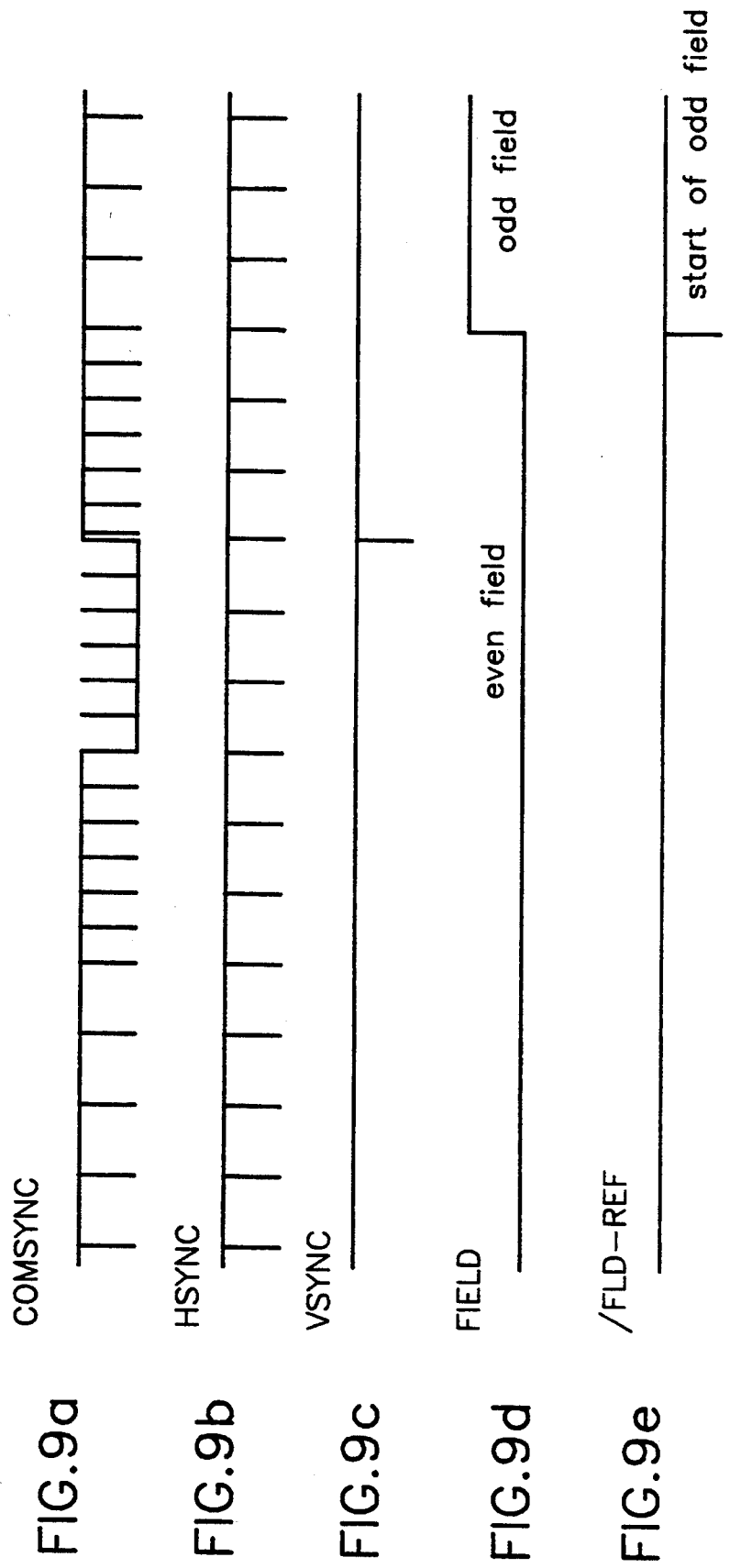

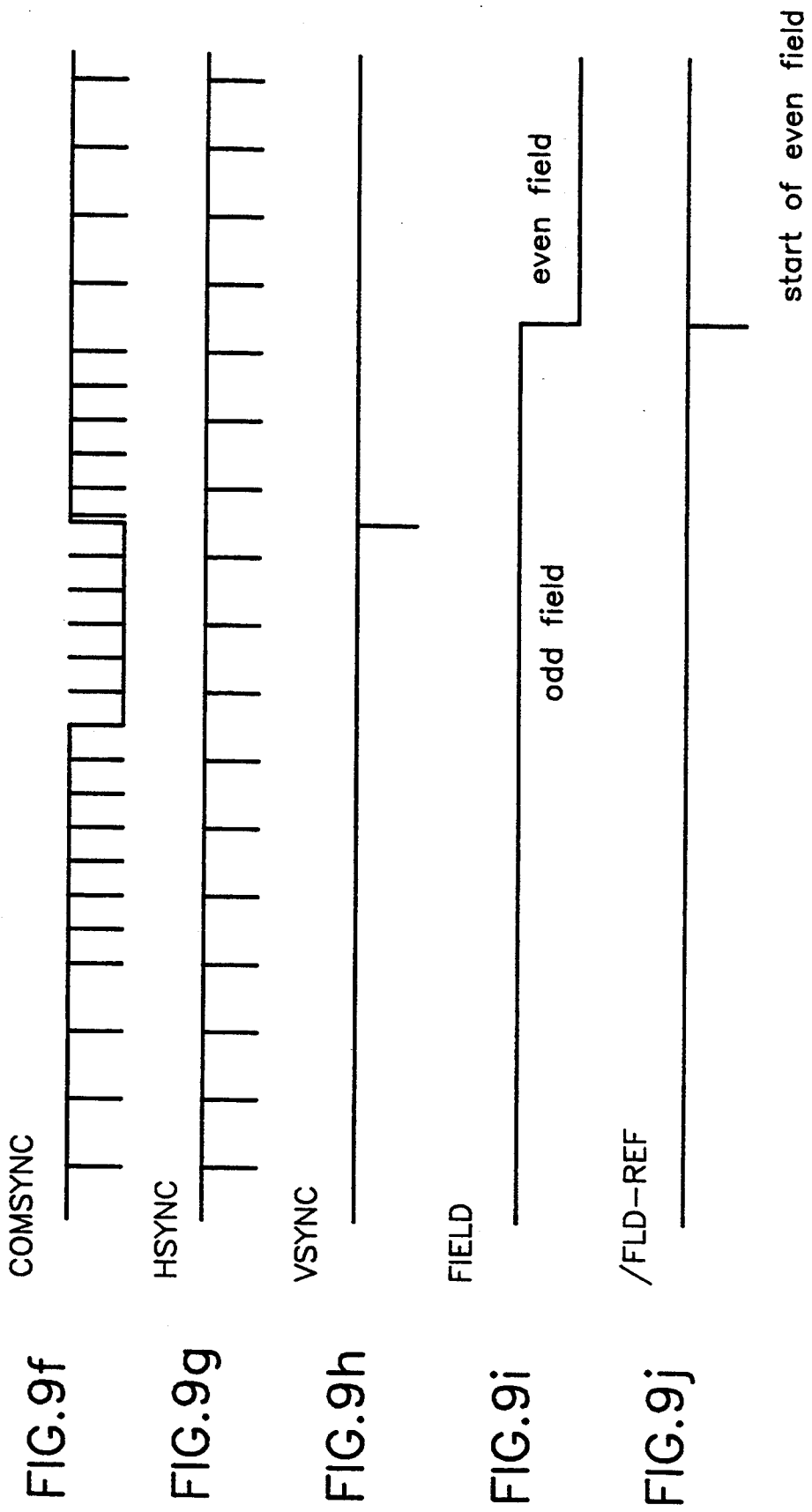

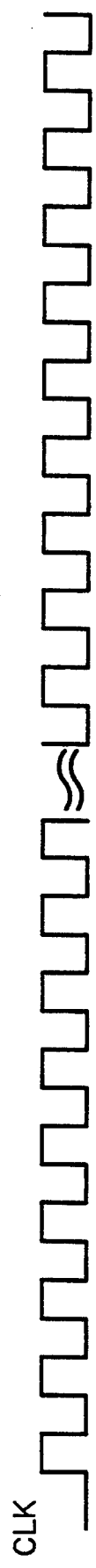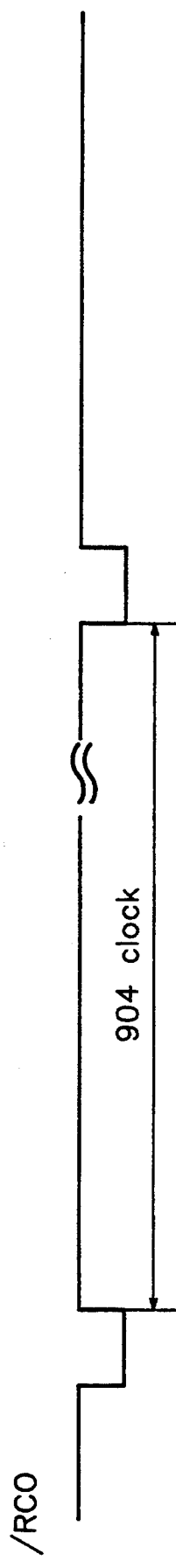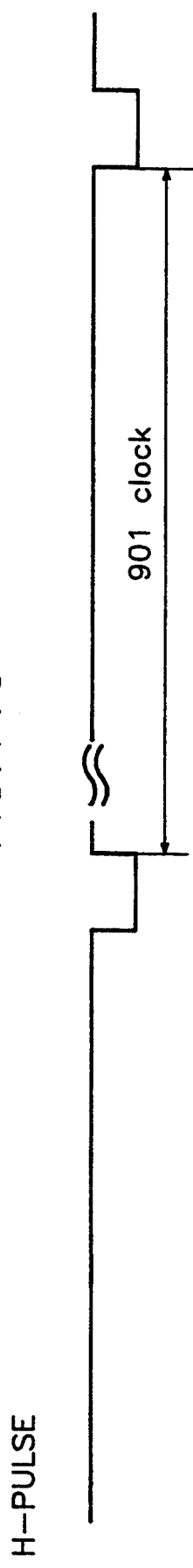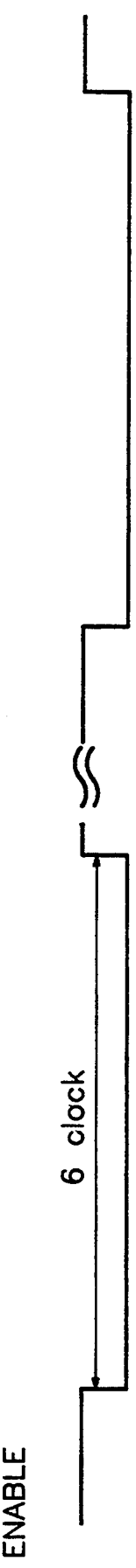
FIG.11a CLK
FIG.11b /RCO — 904 clock
FIG.11c H-PULSE — 901 clock
FIG.11d ENABLE — 6 clock

CLK  /CE  /RWS  /WE  /ADDR-INC

FIG.13e 263H
FIG.13f 262H
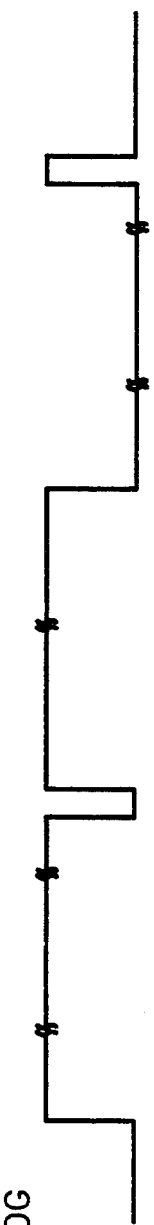
FIG.13g BURST-TOG

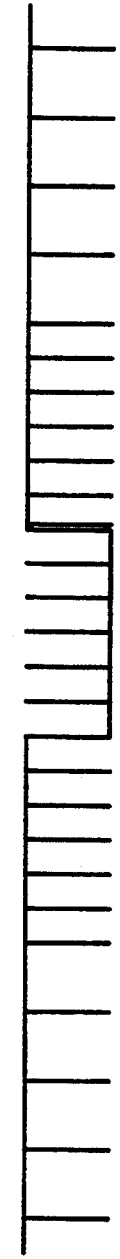

APPARATUS FOR PROCESSING STILL PICTURE IN VIDEO LASER DISC PLAYER

BACKGROUND OF THE INVENTION

1. Field of the Invention

The present invention relates in general to video laser disc players for playing back a video signal recorded on a laser disc and displaying the played back video signal on a screen, and more particularly to an apparatus for processing a still picture in a video laser disc player, in which video signals recorded on laser discs of the CLV type as well as the CAL type can be displayed as the still pictures.

2. Description of the Prior Art

Conventionally, a video signal of one frame is recorded every one circumference (one track) on a laser disc of the constant angular velocity (CAL) type. The recorded video signal of one frame is played back and then displayed as a still picture on a screen. Thereafter, one track is jumped so that the just previously displayed video signal of one frame is again played back and displayed on the screen. The above operation is repeatedly performed to obtain the still picture. One example of this form of apparatus is shown in FIG. 1, herein.

Referring to FIG. 1, there is shown a block diagram of a conventional apparatus for processing a still picture in a video laser disc player, in which a video signal recorded on a laser disc of the CAL type is processed as the still picture. As shown in this drawing, the conventional still picture processing apparatus comprises a microcomputer 1 for inputting an external still picture signal STL and an external vertical synchronization signal VSYNC and outputting a one track jump signal 1TRK and a color burst phase correcting signal TOG by detecting an end point of an even field (second field) according to detection of the vertical synchronization signal VSYNC in a still picture mode, a one track jumping part 2 for jumping a video track of the laser disc of the CAL type by one track in response to the one track jump signal 1TRK from the microcomputer 1, and a color burst phase correcting part 3 for inverting a phase of a color burst of a video signal VIN in the still picture mode in response to the color burst phase correcting signal TOG from the microcomputer 1 and then outputting a video signal VOUT in which the phase of the color burst has been corrected.

The operation of the conventional still picture processing apparatus with the above-mentioned construction will hereinafter be described with reference to FIG. 2.

In FIG. 2, there is shown one example of the laser disc of the CAL type. The laser disc LD of the CAL type comprises two regions which are partitioned at a desired angle with respect to a rotation direction of the disc. One of the two regions is a video information region in which the video signal is recorded and the other is a blank region in which the vertical synchronization signal is recorded. The video signal recorded on the laser disc LD of the CAL type is played back by moving a pick-up along the video track of the disc. Upon inputting the external still picture signal STL in the middle of playing back the video signal from the laser disc LD of the CAL type, the microcomputer 1 scans the end point of the even field or the second field of the one frame by detecting the vertical synchronization signal VSYNC recorded in the blank region of the laser disc LD.

In the case where the vertical synchronization signal VSYNC is active and a field signal FIELD designates an odd filed or the first field of the one frame, the microcomputer 1 outputs the one track jump signal 1TRK to the one track jumping part 2. In response to the one track jump signal 1TRK from the microcomputer 1, the one track jumping part 2 jumps the video track of the laser disc LD by one track to the just previous track in a blank interval. As a result, the just previously played back and displayed video signal of one frame is again played back and displayed on the screen.

On the other hand, the color burst phase correcting part 3 inputs the color burst phase correcting signal TOG which is provided from the microcomputer 1 to prevent a discreteness of the phase of the color burst of the video signal. In response to the color burst phase correcting signal TOG from the microcomputer 1, the color burst phase correcting part 3 inverts the phase of the color burst of the video signal VIN every frame, thereby allowing the phase of the color burst to be successive.

Subsequently, upon inputting the still picture signal STL continuously, the microcomputer 1 outputs the one track jump signal 1TRK to the one track jumping part 2 every frame, thereby causing only the video signal VOUT of one frame stored on the same track to be successively outputted. As a result, the still picture can be displayed on the screen.

However, the conventional still picture processing apparatus of the one track jumping manner as mentioned above has a disadvantage in that it can display the video signal played back from the laser disc as the still picture only in the case of using the laser disc of the CAL type in which the blank region is set to a fixed region on the laser disc as shown in FIG. 2. Namely, the conventional still picture processing apparatus of the one track jumping manner cannot display the video signal from the laser disc as the still picture in the case of using the laser disc of the CLV type in which lengths of the video tracks are the same in any place on the laser disc and the blank region is thus present at random on the video tracks of the laser disc, differently from the CAL type.

Also in the conventional still picture processing apparatus of the one track jumping manner, the one track must stably be jumped in the blank interval of the laser disc to guarantee a quality of the still picture. This stable jumping operation imposes a heavy burden on a servo system. Further, the microcomputer 1 must continue to control the one track jumping part 2 in the process of the still picture. For this reason, the microcomputer 1 cannot perform other commands at that time, resulting in a difficulty in the operation of the circuitry.

SUMMARY OF THE INVENTION

Therefore, the present invention has been made in view of the above problems, and it is an object of the present invention to provide an apparatus for processing a still picture in a video laser disc player, in which video signals recorded on laser discs of the CLV type as well as the CAL type can be displayed as the still pictures.

In accordance with the present invention, the above and other objects can be accomplished by a provision of an apparatus for processing a still picture in a video laser disc player, comprising: a video memory for storing or outputting a video signal of one frame played back from a laser disc in the unit of field every frame in a still picture mode response to a write or read address signal and control signals; field separation means for separating odd and even fields from an external composite synchronization signal and outputting a field signal designating the odd and even fields and a field reference signal designating start points of the odd and even fields in accordance with the separated result; memory store interval control means for outputting a memory store interval control signal in response to the field signal and the field reference signal from said field separation means, an external still picture signal and a signal designating the even field so that an even field portion of a video signal of one frame to be processed as the still picture in the still picture mode can be stored in said video memory; memory control means responsive to the memory store interval control signal from said memory store interval control means for outputting an address increment signal and a self-horizontal synchronization signal and outputting a chip enable signal, a write/read select signal and a write enable signal as the control signals to said video memory; memory address generation means for outputting the write or read address signal to said video memory, the even field designating signal to said memory store interval control means and a color burst phase correcting signal in the still picture mode in response to the address increment signal and the horizontal synchronization signal from said memory control means; and video signal processing means responsive to the color burst phase correcting signal from said memory address generation means and an external video switching signal for outputting an input video signal of one frame played back from the laser disc directly as an output video signal in a normal mode and, in the still picture mode, outputting the input video signal from the laser disc as a memory output video signal to said video memory, processing an input video signal of one field from said video memory as a video signal of one frame and then outputting the processed video signal as the output video signal.

BRIEF DESCRIPTION OF THE DRAWINGS

The above and other objects, features and advantages of the present invention will be more clearly understood from the following detailed description taken in conjunction with the accompanying drawings, in which:

FIGS. 9A to 9J are timing diagrams of signals in the field separation means in FIG. 4;

FIGS. 11A to 11D are timing diagrams of signals in the memory control means in FIG. 6;

FIGS. 13A to 13G are timing diagrams of signals in the memory address generation means in FIG. 7; and FIGS. 14A to 14D are timing diagrams of signals in making a video signal of odd field in accordance with the present invention.

DETAILED DESCRIPTION OF THE INVENTION

Figure 1:
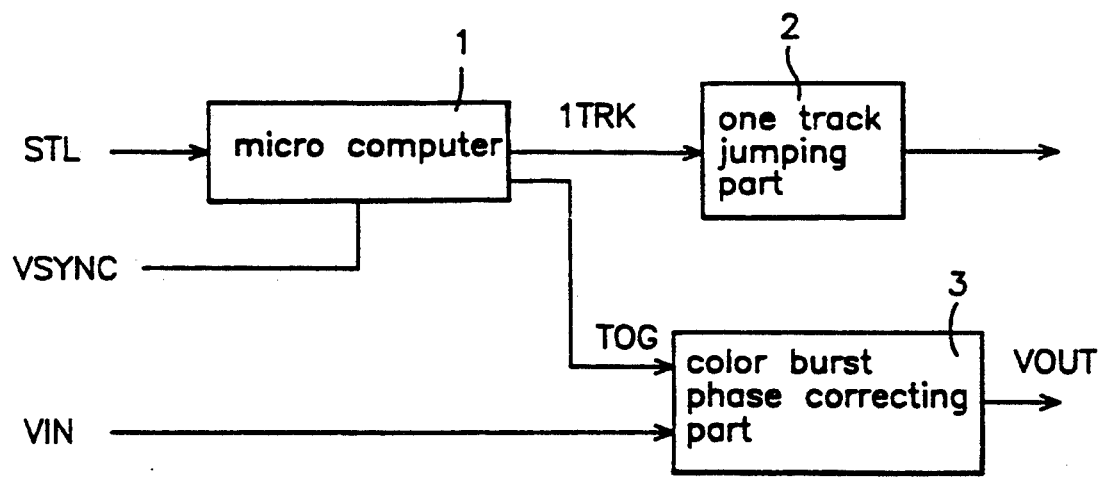
FIG. 1 is a block diagram of a conventional apparatus for processing a still picture in a video laser disc player.
Figure 2:
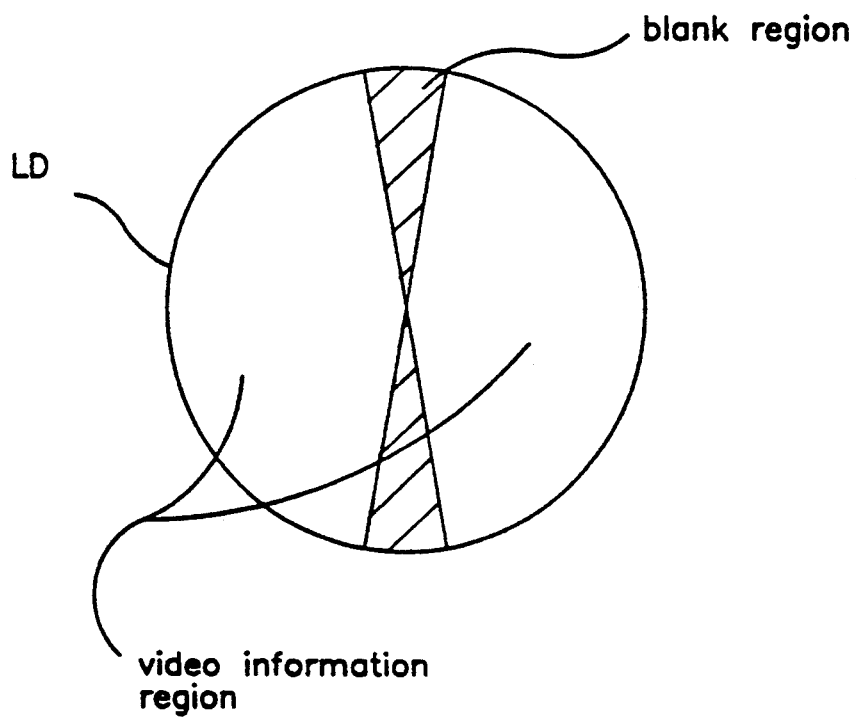
FIG. 2 is a view illustrating a construction of a laser disc of the CAL type which is applied to the apparatus in FIG. 1.
Figure 3:
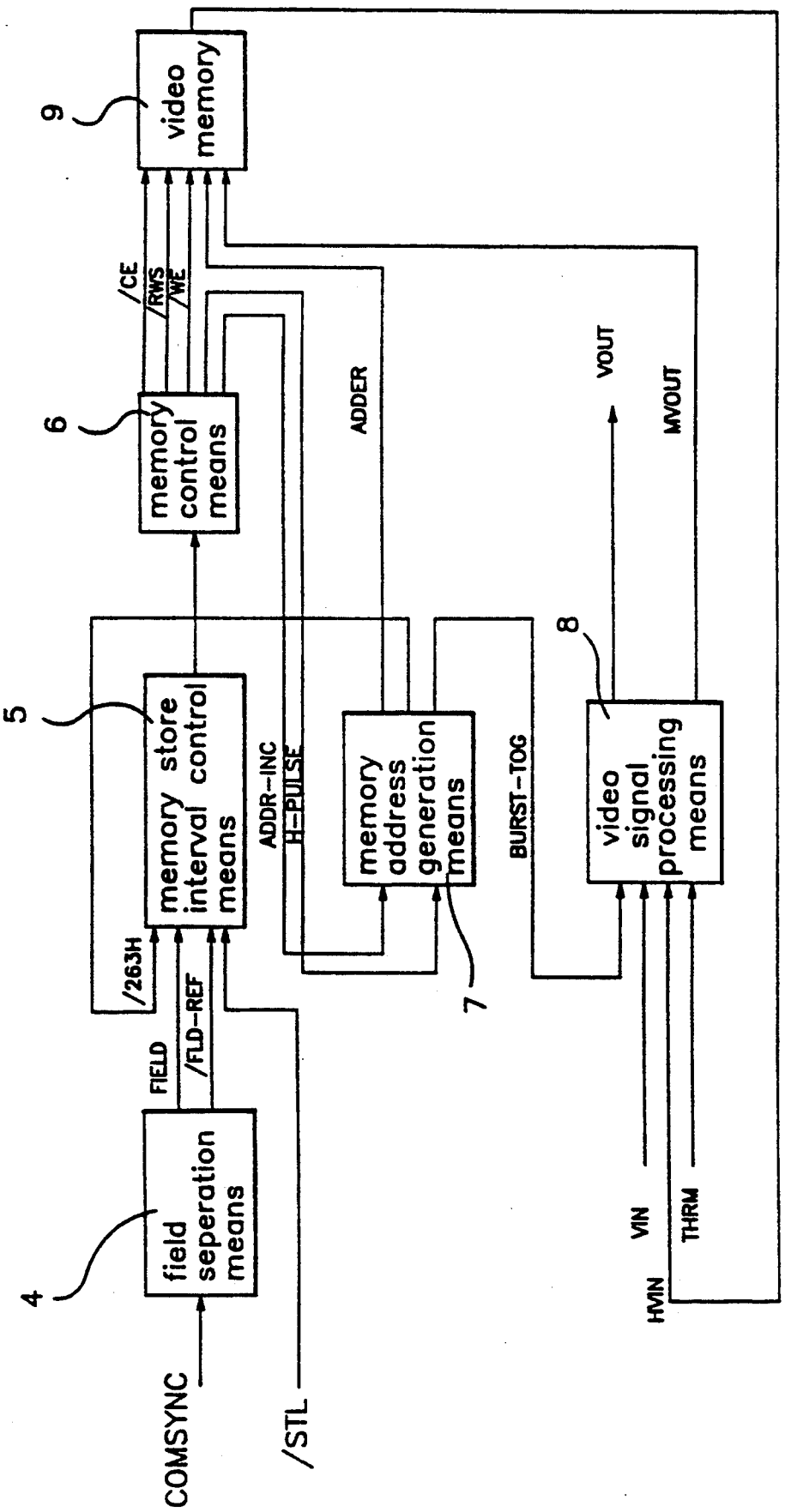
FIG. 3 is a block diagram of an apparatus for processing a still picture in a video laser disc player in accordance with the present invention.

Referring to FIG. 3, there is shown a block diagram of an apparatus for processing a still picture in a video laser disc player in accordance with the present invention. As shown in this drawing, the still picture processing apparatus of the present invention comprises a video memory 9 for storing or outputting a video signal of one frame played back from a laser disc in the unit of field every frame in a still picture mode in response to a write or read address signal ADDR and control signals, field separation means 4 for separating odd and even fields from an external composite synchronization signal COMSYNC and outputting a field signal FIELD designating the odd and even fields and a field reference signal /FLD-REF designating start points of the odd and even fields in accordance with the separated result, and memory store interval control means 5 for outputting a memory store interval control signal /MEM-WE in response to the field signal FIELD and the field reference signal /FLD-REF from the field separation means 4, an external still picture signal /STL and a /263H signal designating the even field so that an even field portion of a video signal of one frame to be processed as the still picture in the still picture mode can be stored in the video memory 9.

Memory control means 6 is also provided in the still picture processing apparatus to output an address increment signal ADDR-INC and a self-horizontal synchronization signal H-PULSE in response to the memory store interval control signal /MEM-WE from the memory store interval control means 5. The memory control means 6 also outputs a chip enable signal /CE, a write/read select signal /RWS and a write enable signal /WE as the control signals to the video memory 9 in response to the memory store interval control signal /MEM-WE from the memory store interval control means 5. The horizontal synchronization signal H-PULSE is outputted from the memory control means 6 every one horizontal scanning line 1H.

Memory address generation means 7 is also provided in the still picture processing apparatus to output the write or read address signal ADDR to the video memory 9, the /263H signal to the memory store interval control means 5 and a color burst phase correcting signal BURST-TOG in the still picture mode in response to the address increment signal ADDR-INC and the horizontal synchronization signal H-PULSE from the memory control means 6.

The still picture processing apparatus also comprises video signal processing means 8 responsive to the color burst phase correcting signal BURST-TOG from the memory address generation means 7 and an external video switching signal THRM to output an input video signal VIN of one frame played back from the laser disc directly as an output video signal VOUT in a normal mode and, in the still picture mode, output the input video signal VIN from the laser disc as a memory output video signal MVOUT to the video memory 9, process an input video signal MVIN of one field from the video memory 9 as a video signal of one frame and then output the processed video signal as the output video signal VOUT.

The operation of the still picture processing apparatus with the above-mentioned construction in accordance with the present invention will hereinafter be described.

Upon receiving the composite synchronization signal COMSYNC, the field separation means 4 separates the odd and even fields from the received external composite synchronization signal COMSYNC. As a result of the separation, the field separation means 4 outputs the field signal FIELD indicating that the present field is the odd or even field and the field reference signal /FLD-REF designating the start points of the odd and even fields.

The field signal FIELD and the field reference signal /FLD-REF from the field separation means 4 are applied to the memory store interval control means 5 which is also applied with the /263H signal from the memory address generation means 6 designating the even field 263H and the external still picture signal /STL. In response to the inputted signals, the memory store interval control means 5 outputs the memory store interval control signal /MEM-WE so that the even field portion of the video signal of one frame which is played back from the laser disc and is to be processed as the still picture in the still picture mode can be stored in the video memory 9.

The memory store interval control signal /MEM-WE from the memory store interval control means 5 is applied to the memory control means 6. When the memory store interval control signal /MEM-WE is low, the memory control means 6 outputs the write enable signal /WE to the video memory 9. On the contrary, when the memory store interval control signal /MEM-WE is high, the memory control means 8 outputs the chip enable signal /CE and the write/read select signal /RWS to the video memory 9.

Therefore, the video memory 9 is write-enabled in an even field interval in which the memory store interval control signal /MEM-WE is low, and thus stores the memory output video signal MVOUT from the video signal processing means 8 in its location corresponding to the write address signal ADDR from the memory address generation means 7. Also, in an odd field interval in which the memory store interval control signal /MEM-WE is high, the video memory 9 is read-enabled. In this case, the video memory 9 outputs the video signal of even field stored in its location corresponding to the read address signal ADDR from the memory address generation means 7. The video signal MVIN of even field read from the video memory 9 is directly outputted in the even field. In the odd field, the video signal MVIN of even field read from the video memory 9 is applied as the input memory video signal MVIN to the video signal processing means 8 so that it can constitute the video signal of odd field.

The memory control means 6 also outputs the address increment signal ADDR-INC and generates the self-horizontal synchronization signal H-PULSE every one horizontal scanning line 1H. The address increment signal ADDR-INC from the memory control means 6 is applied to the memory address generation means 7 to increment the write address signal ADDR to the video memory 9 in the even field interval in which the memory store interval control signal /MEM-WE is low. Also, the address increment signal ADDR-INC from the memory control means 6 is applied to the memory address generation means 7 to increment the read address signal ADDR to the video memory 9 in the odd field interval in which the memory store interval control signal /MEM-WE is high.

In response to the address increment signal ADDR-INC and the horizontal synchronization signal H-PULSE from the memory control means 6, the memory address generation means 7 outputs the write or read address signal ADDR to the video memory 9. Also, the memory address generation means 7 outputs the /263H signal designating the even field to the memory store internal control means 5 and the color burst phase correcting signal BURST-TOG to the video signal processing means 8.

The video signal processing means 8 receives the color burst phase correcting signal BURST-TOG from the memory address generation means 7 and the external video switching signal THRM. When the video switching signal THRM is low, the present mode is the normal mode. In this case, the video signal processing means 8 processes a general picture. Namely, the video signal processing means 8 outputs the input video signal VIN of one frame played back from the laser disc directly as the output video signal VOUT which is normally played back. As a result displayed on the screen is the normally played back picture.

When the video switching signal THRM is high, the present mode is the still picture mode. In this case, the video signal processing means 8 processes the still picture. Namely, in the even field interval, the video signal processing means 8 reads the memory input video signal MVIN of even field stored in the location of the video memory 9 corresponding to the address signal ADDR from the memory address generation means 7 and outputs the read video signal directly at the output video signal VOUT. In the odd field interval, the video signal processing means 8 makes the video signal of odd field of the read memory input video signal MVIN of even field and outputs the made video signal as the output video signal VOUT. As a result, the still picture of one frame is displayed on the screen.

Also, the video signal processing means 8 controls a timing of the output video signal VOUT for the still picture in response to the color burst phase correcting signal BURST-TOG from the memory address generation means 7 so that the phase of the color burst can be maintained successive. This continuity of the phase of the color burst has the effect of stabilizing the output video signal VOUT.

Now, the construction and operation of the still picture processing apparatus in accordance with the present invention will be described in detail with reference to FIGS. 4 to 14D.

Figure 4:
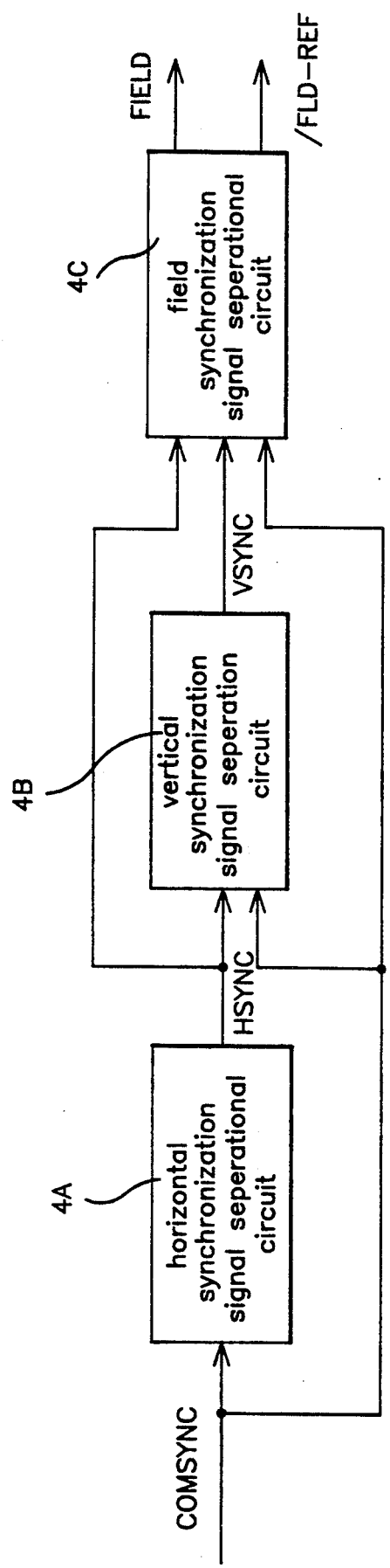
FIG. 4 is a block diagram of field separation means in the apparatus in FIG. 3.

Referring to FIG. 4, there is shown a block diagram of the field separation means 4 in the apparatus in FIG. 3. As shown in this drawing, the field separation means 4 includes a horizontal synchronization signal separation circuit 4A for separating a horizontal synchronization signal HSYNC from the external composite synchronization signal COMSYNC, a vertical synchronization signal separation circuit 4B for separating a vertical synchronization signal VSYNC from the external composite synchronization signal COMSYNC in response to the separated horizontal synchronization signal HSYNC from the horizontal synchronization signal separation circuit 4A, and a field separation circuit 4C for separating the odd and even fields from the external composite synchronization signal COMSYNC in response to the separated horizontal and vertical synchronization signals HSYNC and VSYNC from the horizontal and vertical synchronization signal separation circuits 4A and 4B and outputting the field signal FIELD designating the odd and even fields and the field reference signal /FLD-REF designating the start points of the odd and even fields in accordance with the separated result.

The operation of the field separation means 4 will hereinafter be described in detail with reference to FIGS. 9A to 9J which are timing diagrams of the signals in the field separation means 4 in FIG. 4.

In the even field interval, upon receiving the external composite synchronization signal COMSYNC as shown in FIG. 9A, the horizontal synchronization signal separation circuit 4A separates the horizontal synchronization signal HSYNC as shown in FIG. 9B from the received external composite synchronization signal COMSYNC. Also, the vertical synchronization signal separation circuit 4B separates the vertical synchronization signal VSYNC as shown in FIG. 9C from the composite synchronization signal COMSYNC in response to the separated horizontal synchronization signal HSYNC from the horizontal synchronization signal separation circuit 4A. The field separation circuit 4C separates the odd and even fields from the external composite synchronization signal COMSYNC in response to the separated horizontal and vertical synchronization signals HSYNC and VSYNC from the horizontal and vertical synchronization signal separation circuits 4A and 4B. As a result of the separation, the field separation circuit 4C outputs the field signal FIELD designating the odd and even fields as shown in FIG. 9D and the field reference signal /FLD-REF designating the start point of the odd field as shown in FIG. 9E.

In the odd field interval, upon receiving the external composite synchronization signal COMSYNC as shown in FIG. 9F, the horizontal synchronization signal separation circuit 4A separates the horizontal synchronization signal HSYNC as shown in FIG. 9G from the received external composite synchronization signal COMSYNC and the vertical synchronization signal separation circuit 4B separates the vertical synchronization signal VSYNC as shown in FIG. 9H from the composite synchronization signal COMSYNC in response to the separated horizontal synchronization signal HSYNC from the horizontal synchronization signal separation circuit 4A. Similarly to that in the even field, the field separation circuit 4C separates the odd and even fields from the external composite synchronization signal COMSYNC in response to the separated horizontal and vertical synchronization signals HSYNC and VSYNC from the horizontal and vertical synchronization signal separation circuits 4A and 4B. As a result of the separation, the field separation circuit 4C outputs the field signal FIELD designating the odd and even fields as shown in FIG. 9I and the field reference signal /FLD-REF designating the start point of the even field as shown in FIG. 9J. Here, the present field is the even field if the field signal FIELD is low and the odd field if the field signal FIELD is high.

Figure 5:
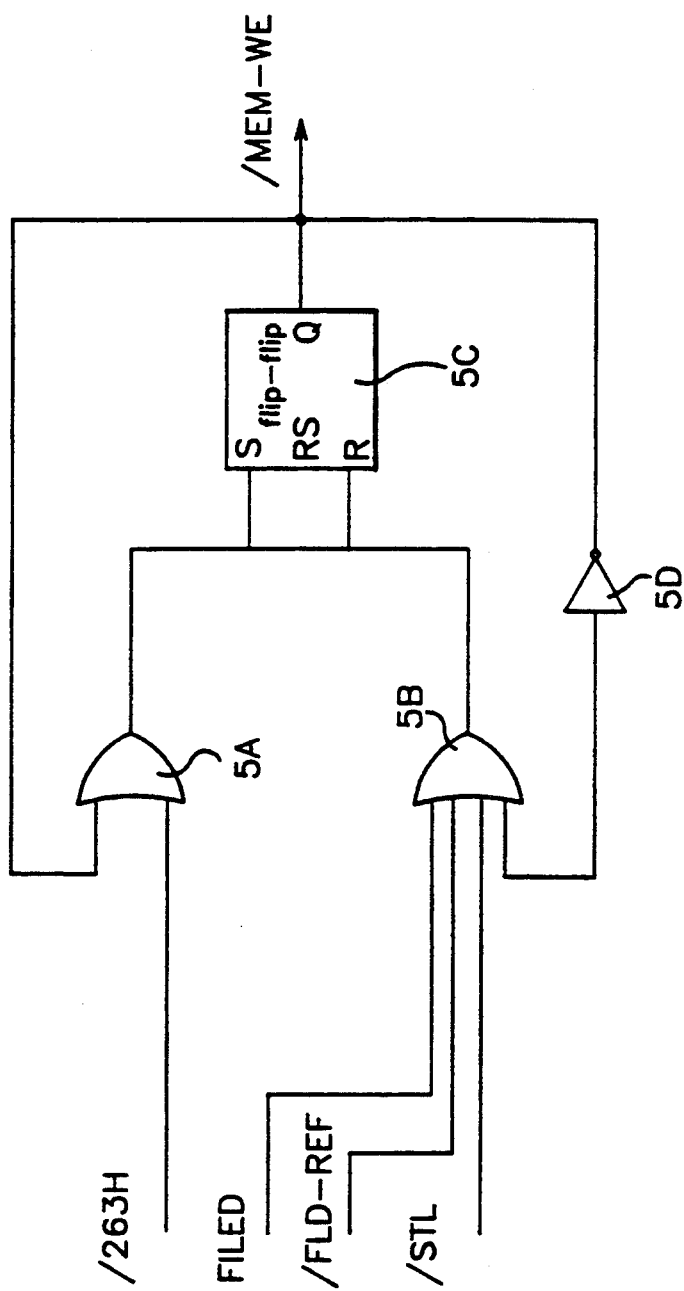
FIG. 5 is a functional block diagram of memory store interval control means in the apparatus in FIG. 3.

FIG. 5 is a functional block diagram of the memory store interval control means 5 in the apparatus in FIG. 3 and FIGS. 10A to 10E are timing diagrams of the signals in the memory store interval control means 5 in FIG. 5. The memory store internal control means 5 is adapted to determine an interval of the video signal being stored in the video memory 9. As shown in FIG. 5, the memory store interval control means 5 includes a RS flip-flop 5C for outputting the memory store interval control signal /MEM-WE in response to input signals at its set terminal S and reset terminal R, the memory store interval control signal /MEM-WE being enabled in the even field, and an OR gate 5A for ORing the memory store interval control signal /MEM-WE from the RS flip-flop 5C and the even field designating /263H signal from the memory address generation means 7 and outputting the ORed signal to the set terminal S of the RS flip-flop 5C to disable the memory store interval control signal /MEM-WE at an end point of a memory store interval.

The memory store interval control means 5 also includes an inverter gate 5D for inverting the memory store interval control signal /MEM-WE from the RS flip-flop 5C, and an OR gate 5B for ORing the field signal FIELD and the field reference signal /FLD-REF from the field separation means 4, the external still picture signal /STL and an output signal from the inverter gate 5D and outputting the ORed signal to the reset terminal R of the RS flip-flop 5C to enable the memory store interval control signal /MEM-WE at a start point of the memory store interval.

Figure 10A:
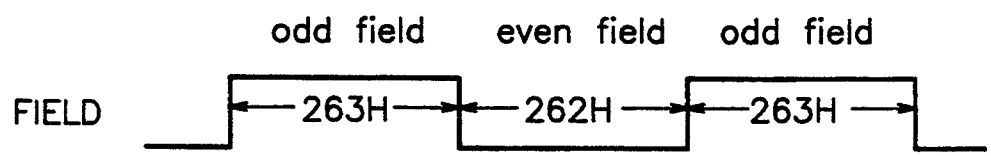
FIGS. 10A to 10E are timing diagrams of signals in the memory store interval control means in FIG. 5.

Noticeably, in an interlaced scanning manner, one frame consists of two fields or the odd and even fields. The odd field has 263 horizontal scanning lines and the even field has 262 horizontal scanning lines. Therefore, as shown in FIG. 10A, the field signal FIELD from the field separation means 4 is high in the odd field interval of the 263 horizontal scanning lines 263H and low in the even field interval of the 262 horizontal scanning lines 262H. Also, as shown in FIG. 10C, the /263H signal from the memory address generation means 7 is high in a 263H interval beginning with the start point of the even field, or a 262H even field+1H of the odd field interval, and low in the remaining 262H of the odd field. The 263H signal is a pulse signal these high and low states of which are repeated.

Figure 10B:
Figure 10C:
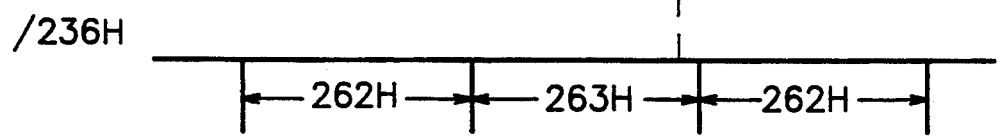

In operation, in the normal mode, when the field signal FIELD as shown in FIG. 10A and the field reference signal /FLD-REF as shown in FIG. 10b from the field separation means 4 and the /263H signal as shown in FIG. 10C from the memory address generation means 7 are applied to the memory store interval control means 5, the outputs of the OR gates 5A and 5B go high. As a result, the flip-flop 5C maintains its previous state natural and the memory store interval control signal /MEM-WE remains at its previous state or high state.

Figure 10D:

At this time, if the external still picture signal /STL as shown in FIG. 10D is applied to the memory store interval control means 5, the output of the OR gate 5B goes low, since the field signal FIELD is low in the even field, the memory store interval control signal /MEM-WE goes low through the inverter gate 5D and the still picture signal /STL is low. The low output of the OR gate 5B is applied to the reset terminal R of the RS flip-flop 5C.

Subsequently, the memory store interval control signal /MEM-WE from the RS flip-flop 5C goes low in the even field in the still picture mode. During this interval in which the memory store interval control signal /MEM-WE is low, the even field portion of the video signal of one frame played back from the laser disc is stored in the location of the video memory 9 corresponding to the write address signal ADDR from the memory address generation means 7.

If the /263H signal from the memory address generation means 7 goes low during storage of the video signal in the video memory 9 due to the low state of the memory store interval control signal /MEM-WE, the output of the OR gate 5A goes low and then applied to the set terminal S of the flip-flop 5C, thereby causing the flip-flop 5C to be set. As a result, the memory store interval control signal /MEM-WE goes high as shown in FIG. 10E, resulting in completion of the storage of the video signal in the video memory 9.

Figure 10E:
Figure 12A:
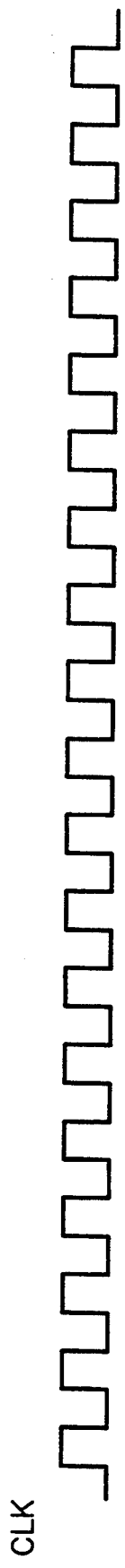
FIGS. 12A to 12E are timing diagrams of signals in a memory control signal output unit in the memory control means in FIG. 6.
Figure 12B:
Figure 12C:
Figure 12D:
Figure 12E:

As mentioned above, the memory store interval control signal /MEM-WE functions as shown in FIG. 10E so that the video memory 9 stores the video signal of the 263 horizontal scanning lines 263H or 262 horizontal scanning lines 262H of the even field and 1 horizontal scanning line 1H of the odd field.

In the video memory 9, 8 sampled pixels are stored in the unit of address. Provided that the video signal is sampled at a sampling period of 4 fsc (fsc=14.318 MHz), one horizontal scanning line 1H includes 910 sampling points (910 clocks). For this reason, 113.75 addresses are necessary to one horizontal scanning line 1H. However, since 113.75 memory locations cannot be addressed, the video signal is stored in the memory locations corresponding to 113 addresses, with the remaining 6 sampled data not stored. Therefore, to read the video signal perfectly, there is a necessity for reading the data of the video signal stored at the 113th address location by 6 times, additionally. This is accomplished by storing a start portion of the horizontal synchronization signal in the leading address location and storing a front porch portion of the composite video signal in the 113th address location. This operation is performed continuously until the horizontal synchronization signal of the video signal is started. In result, since the video signal data in the 113th address location is the same as 6 sampled data after the 113th address, 6 clocks can be applied. This is performed by the memory control means 6, as will hereinafter be described in detail.

Figure 6:
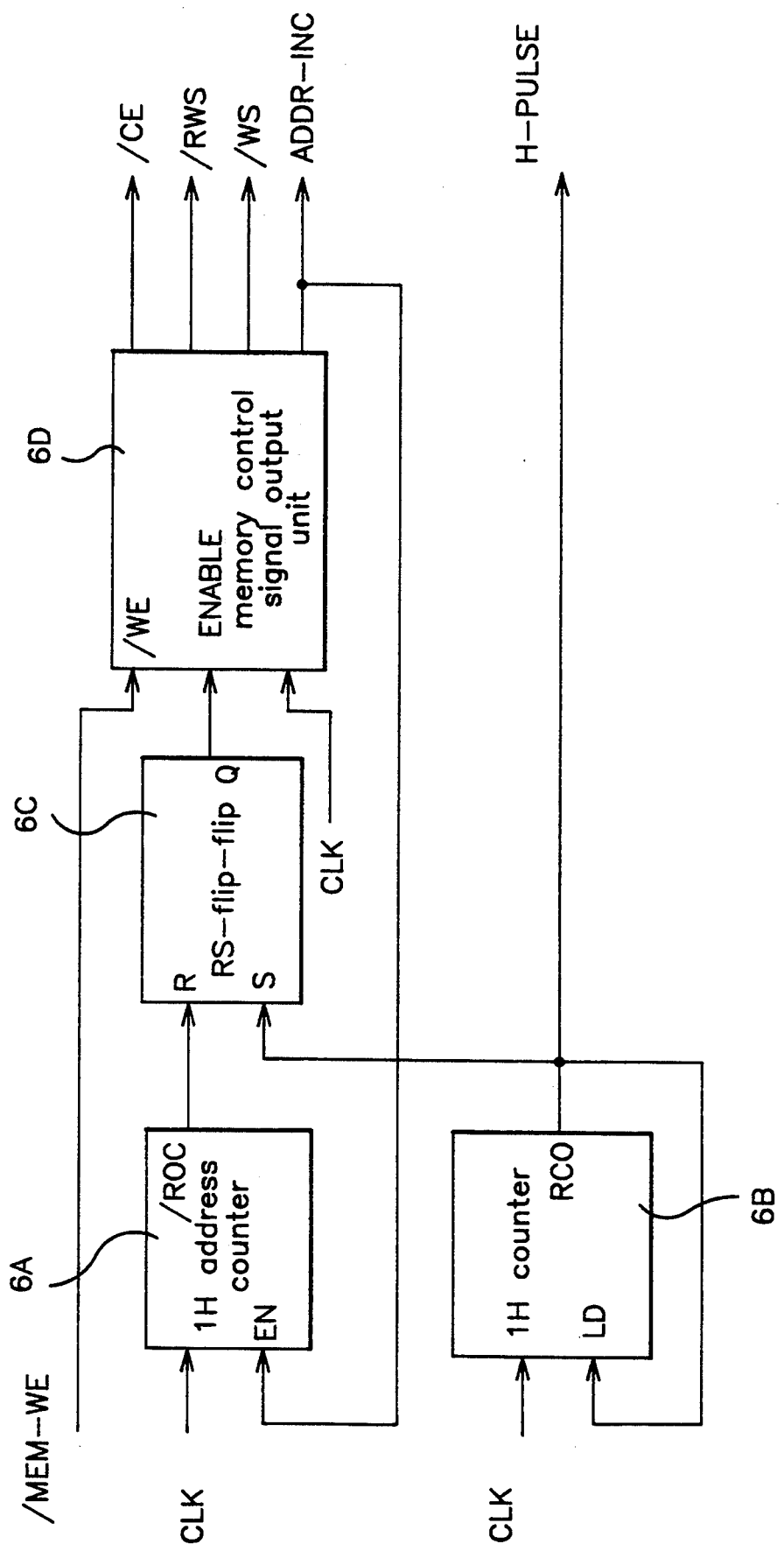
FIG. 6 is a functional block diagram of memory control means in the apparatus in FIG. 3.

FIG. 6 is a functional block diagram of the memory control means 6 in the apparatus in FIG. 3 and FIGS. 11A to 11D are timing diagrams of the signals in the memory control means 4 in FIG. 6. As shown in this drawing, the memory control means 6 includes a 1H address counter 6A for counting addresses of one horizontal scanning line 1H for storing sampled pixels of one horizontal scanning line 1H and outputting the counted value as a ripple carry-out signal /RCO, a 1H counter 6B for counting sampling pulses (a clock signal) of one horizontal scanning line 1H, outputting the resultant ripple carry-out signal /RCO as the self-horizontal synchronization signal H-PULSE to the memory address generation means 7 and inputting the self-horizontal synchronization signal H-PULSE fed back thereto as a load signal LD, and a RS flip-flop 6C being reset by the ripple carry-out signal /RCO from the 1H address counter 6A and being set by the ripple carry-out signal /RCO from the 1H counter 6B.

The memory control means 6 also includes a memory control signal output unit 6D being disabled when the RS flip-flop 6C is reset and being enabled when the RS flip-flop 6C is set. The memory control signal output unit 6D is operative responsive to the memory store interval control signal /MEM-WE from the memory store interval control means 5 to output the chip enable signal /CE, the write/read select signal /RWS and the write enable signal /WE as the control signals to the video memory 9 and output the address increment signal ADDR-INC to an enable terminal EN of the 1H address counter 6A and the memory address generation means 7.

In operation, the clock signal CLK as shown in FIG. 11A is applied to the memory control means 6. At this time, the 1H address counter 6A counts the 113 addresses or the addresses of one horizontal scanning line 1H for storing the sampled pixels of one horizontal scanning line 1H and outputs the counted value as the ripple carry-out signal /RCO as shown in FIG. 11B, thereby causing the RS flip-flop 6C to be reset. As a result, an enable signal ENABLE or the output of the RS flip-flop 6C goes low as shown in FIG. 11D, thereby causing the memory control signal output unit 6D to be disabled.

On the other hand, the 1H counter 6B outputs the ripple carry-out signal /RCO as the horizontal synchronization signal H-PULSE every one horizontal scanning line 1H, thereby causing the flip-flop 6C to be set. As a result, the enable signal ENABLE or the output of the RS flip-flop 6C goes high. This high enable signal ENABLE enables the memory control signal output unit 6D.

In response to the high enable signal ENABLE from the RS flip-flop 6C, the memory control unit 6D outputs the chip enable signal /CE, the write/read select signal /RWS and the write enable signal /WE as the control signals to the video memory 9 and outputs the address increment signal ADDR-INC to the memory address generation means 7 in a timing relation as shown in FIGS. 12A to 12E.

The memory control signal output unit 6D is comprised of a state machine which can control the timing relation of the control signals as shown in FIGS. 12A to 12D in response to the enable signal ENABLE and the memory store interval control signal /MEM-WE as the write enable signal /WE.

Noticeably, because the 1H address counter 6A outputs the ripple carry-out signal /RCO after counting the 113th address of one horizontal scanning line 1H and the 1H counter 6B outputs the ripple carry-out signal /RCO after counting 6 clocks additionally as mentioned above, there is always present a difference of 6 clocks between the ripple carry-out signal /RCO from the 1H address counter 6A and the horizontal synchronization signal H-PULSE or the ripple carry-out signal /RCO from the 1H counter 6B.

Figure 7:
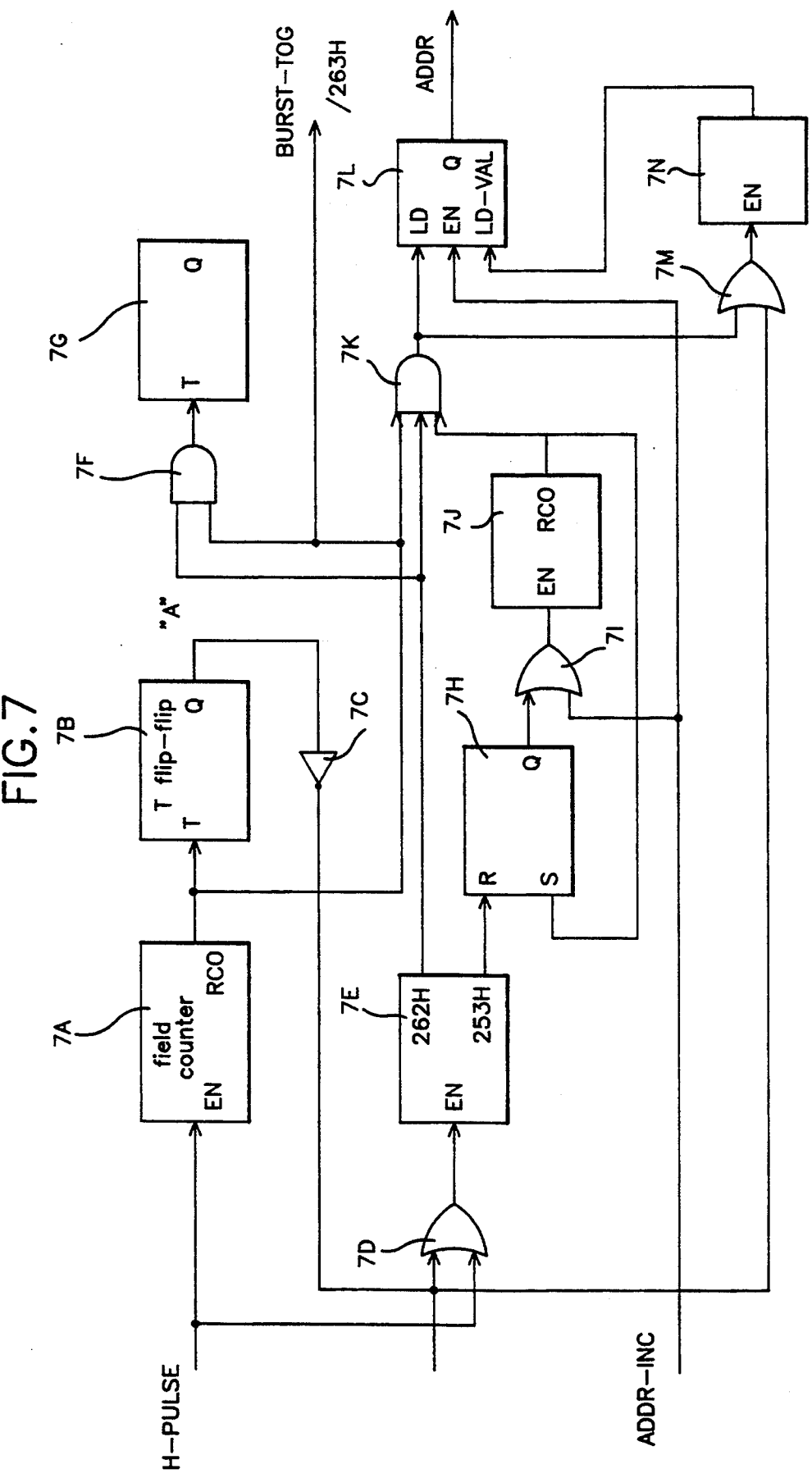
FIG. 7 is a functional block diagram of memory address generation means in the apparatus in FIG. 3.

FIG. 7 is a functional block diagram of the memory address generation means 7 in the apparatus in FIG. 3 and FIGS. 13A to 13G are timing diagrams of the signals in the memory address generation means 7 in FIG. 7. As shown in FIG. 7, the memory address generation means 7 includes a field counter 7A for counting one field in response to the self-horizontal synchronization signal H-PULSE from the memory control means 6 as its enable signal EN and outputting the resultant ripple carry-out signal RCO as the even field designating /263H signal to the memory store interval control means 5, a T flip-flop 7B for outputting a high signal when the output of the field counter 7A designates the odd field 262H and a low signal when the output of the field counter 7A designates the even field 263H, an inverter gate 7C for inverting an output signal from the T flip-flop 7B, an OR gate 7D for ORing an output signal from the inverter gate 7C and the self-horizontal synchronization signal H-PULSE from the memory control means 6, and a 253H/262H counter 7E for outputting first and second control signals in response to an output signal from the OR gate 7D as its enable signal EN to control a timing of an address counter load value for making the video signal of odd field of the video signal of even field.

The memory address generation means 7 also includes an AND gate 7F for ANDing the output signal /263H from the field counter 7A and the first control signal 262H from the 253H/262H counter 7E, a T flip-flop 7G for outputting the color burst phase correcting signal BURST-TOG in response to an output signal from the AND gate 7F, a RS flip-flop 7H for delaying the second control signal 253H from the 253H/262H counter 7E inputted at its reset terminal R by 0.5H in response to an input signal at its set terminal S, an OR gate 7I for ORing an output signal from the RS flip-flop 7G and the address increment signal ADDR-INC from the memory control means 6, a 0.5H counter 7J for counting 0.5H in response to an output signal from the OR gate 7I as its enable signal EN and outputting the resultant ripple carry-out signal RCO to the set terminal S of the RS flip-flop 7H, an AND gate 7K for ANDing the ripple carry-out signal RCO from the 0.5H counter 7J, the first control signal 262H from the 253H/262H counter 7E and the output signal /263H from the field counter 7A, and an OR gate 7M for ORing an output signal from the AND gate 7K and the output signal from the inverter gate 7C.

Also, the memory address generation means 7 includes an address counter load value generator 7N for generating the address counter load value LD-VAL in response to an output signal from the OR gate 7M as its enable signal EN, and an address counter 7L being enabled by the address increment signal ADDR-INC from the memory control means 6 and being loaded by the output signal from the AND gate 7K to output the write or read address signal ADDR in the even or odd field to the video memory 9 in response to the address counter load value LD-VAL from the address counter load value generator 7N.

The memory address generation means 7 is adapted to provide the write or read address ADDR for the video memory 9 so that the video signal of one picture or one frame can be displayed repeatedly in the still picture mode. As a result stored in the video memory 9 is the video signal of even field for constituting the video signal of one frame.

In the case where the video signal of even field is to be outputted to display the video signal of one frame repeatedly in the still picture mode, the video signal of even field stored in the video memory 9 is read and then outputted directly. On the other hand, in the case where the video signal of odd field is to be outputted, the video signal of even field stored in the video memory 9 is read by varying the memory read address. Therefore, in this case, the read video, signal of even field becomes the video signal of odd field.

Figure 13A:
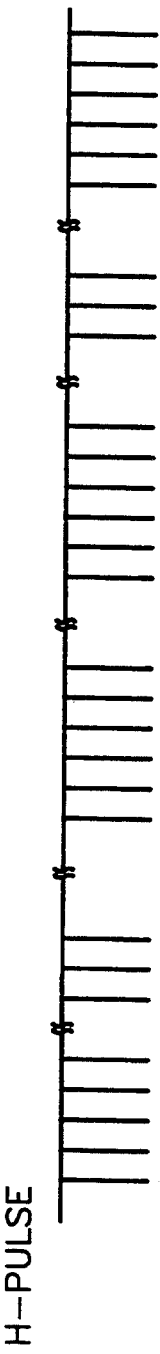
Figure 13B:
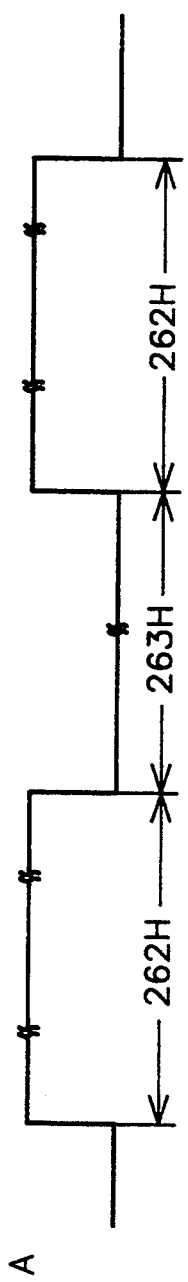

In operation, the field counter 7A outputs the ripple carry-out signal RCO whenever it counts one field in response, to the self-horizontal synchronization signal H-PULSE from the memory control means 6 as shown in FIG. 13A. Namely, the field counter 7A outputs the ripple carry-out signal RCO at 263H, 262H, 263H, 262H . . . . The ripple carry-out signal RCO from the field counter 7A is applied to a toggle input terminal T of the T flip-flop 7B. In response to the ripple carry-out signal RCO from the field counter 7A, the T flip-flop 7B outputs an odd or even field signal (A: high=odd field and A: low=even field) as shown in FIG. 13B at its output terminal Q.

The output A of the T flip-flop 7B is applied through the inverter gate 7C and the OR gate 7D as the enable signal EN to the 253H/262H counter 7E together with the self-horizontal synchronization signal H-PULSE from the memory control means 6. As a result, the 253H/262H counter 7E outputs the first and second control signals 262H and 253H. The output 262H of the 253H/262H counter 7E is applied to the AND gate 7K together with the output 263H (RCO) of the field counter 7A and the output 253H thereof is applied to the reset terminal R of the RS flip-flop 7H, thereby causing the output Q of the RS flip-flop 7H to go low. The low output of the RS flip-flop H is applied through the OR gate 7I to the 0.5H counter 7J together with the address increment signal ADDR-INC from the memory control means 6.

Figure 13C:
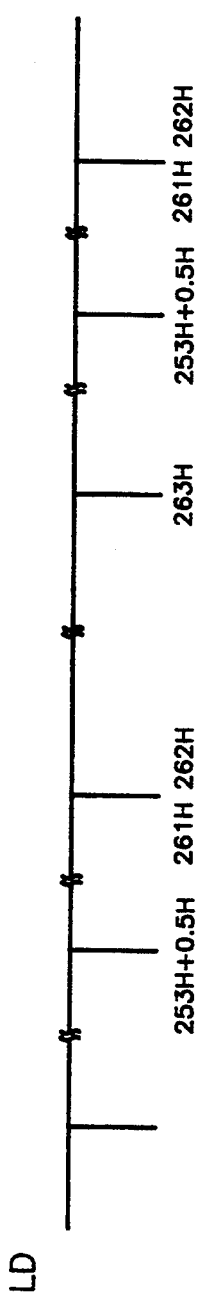

The 0.5H counter 7J counts 0.5H beginning with 253H and outputs the resultant ripple carry-out signal (RCO=253+0.5H) to the set terminal S of the RS flip-flop 7H and the AND gate 7K. As a result, the AND gate 7K outputs a load signal LD repeatedly to the address counter 7L at 253.5H, 262H, 263H, 253.5H, 262H, 263H . . . , as shown in FIG. 13C, thereby causing the address counter 7L to be loaded at 253.5H and 262H in the odd field (A=high). Namely, the field counter 7A counts the self-horizontal synchronization signal H-PULSE to load the address counter 7L repeatedly at 263H, 262H, 263H, 262H . . . and the counters 7E and 7J loads the address counter 7L repeatedly at 253.5H and 262H when the output A of the T flip-flop 7B is high (i.e., odd field).

Figure 13D:
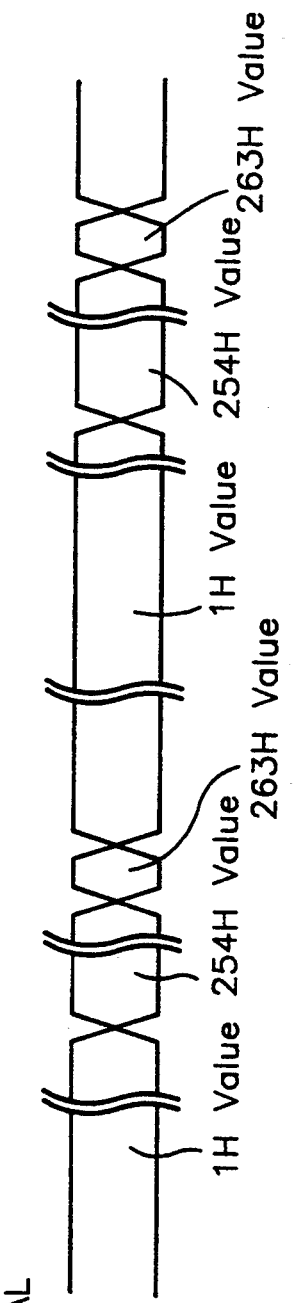

Subsequently, the address counter 7L is loaded with the load value LD-VAL from the load value generator 7N in the above timing. The load value LD-VAL from the load value generator 7N is loaded into the address counter 7L as 254H at 253.5H and 263H at 262H in the even field as shown in FIG. 13D. In result, the video signal of even field can constitute the video signal of odd field.

In other words, as mentioned above with reference to FIG. 10, in the still picture, the video data of 263H is stored and outputted in the even field; however, only the video, data of 262H must be outputted in the odd field. To this end, the load value LD-VAL from the load value generator 7N is loaded into the address counter 7L as 254H at 253.5H and 263H at 262H, resulting in removal of 1H.

In the even and odd fields, there is a difference of 0.5H between equalizing pulses at the front and rear of the fields. In this connection, upon loading with the load value LD-VAL in the timing as shown in FIG. 13D, the address counter 7L outputs the address signal ADDR in response to the load value LD-VAL in the odd field. Then, the stored video signal (data) of even field is read from the memory location corresponding to the address based on the load value. As a result, the read video signal is the video signal of odd field.

To generate the load value LD-VAL, the output A of the T flip-flop 7B as shown in FIG. 13B is inverted through the inverter gate 7C (the output A is inverted into low in the odd field) and then applied through the OR gate 7M to the enable terminal EN of the address counter load value generator 7N. Also, the load signal LD as shown in FIG. 13C is applied to the enable terminal EN of the address counter load value generator 7N through the OR gate 7M. Then, the address counter load value generator 7N generates 254H and 263H as the load value LD-VAL in the timing of 253.5H and 262H.

FIGS. 14A to 14D are timing diagrams of the signals in making the video signal of odd field in the above manner, in which FIG. 14A shows the video signal of even field, FIG. 14B shows the horizontal synchronization signal, FIG. 14C shows the load signal and FIG. 14D shows the resultant video signal of odd field.

By the way, in the case where the video signal of odd field which is made of the video signal of even field is to be displayed, the phase of the color burst must be maintained successive. To this end, the phase of the color burst must be inverted at a desired interval. This is accomplished by delaying data by 2 clocks at a sampling period of 4 fsc. As a result, the continuity of the phase of the color burst can be maintained by inverting the phase of the color burst whenever the video signals of 262H and 263H are outputted, as shown in FIG. 13.

Namely, the output 263H of the counter 7A as shown in 13E and the output 262H of the counter 7E as shown in FIG. 13F are ANDed by the AND gate 7F and then applied to the toggle input terminal T of the T flip-flop 7G, which outputs the color burst phase correcting signal BURST-TOG as shown in FIG. 13G at its output Q. On the basis of the color burst phase correcting signal BURST-TOG from the T flip-flop 7G, the phase of the color burst is inverted at 261H and then inverted at the start point of the even field. Thereafter, the phase of the color burst is again inverted at the start point of the odd field. This operation is repeatedly performed, resulting in the phase of the color burst being maintained successive.

The color burst phase correcting signal BURST-TOG is applied to the video signal processing means 8 for maintaining the continuity of the phase of the color burst in the above manner.

Figure 8:
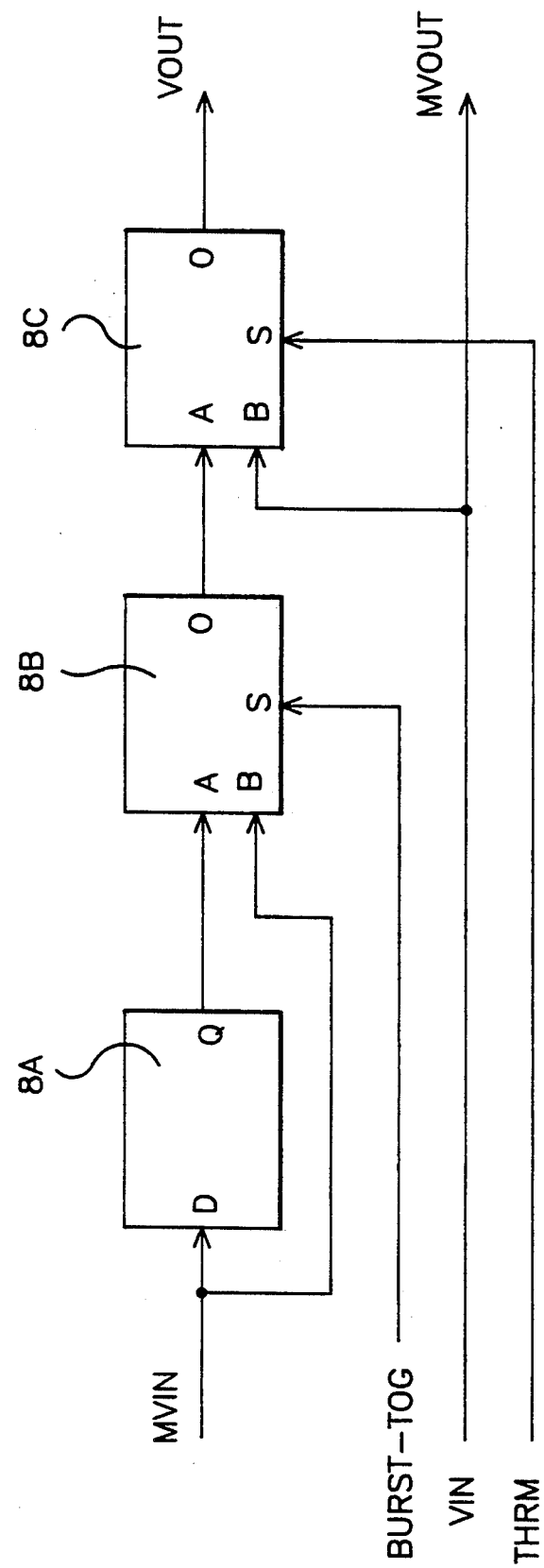
FIG. 8 is a functional block diagram of video signal processing means in the apparatus in FIG. 3.

Referring to FIG. 8, there is shown a functional block diagram of the video signal processing means 8 in the apparatus in FIG. 3. As shown in this drawing, the video signal processing means 8 includes a delay 8A for delaying the memory input video signal MVIN from the video memory 9 by 2 sampling points, a first multiplexer 8B for selecting one of the video signal MVIN' delayed by the delay 8A and the memory input video signal MVIN from the video memory 9 in response to the color burst phase correcting signal BURST-TOG from the memory address generation means 7, and a second multiplexer 8C for selecting an output signal from the first multiplexer 8B and the input video signal VIN normally played back from the laser disc in response to the video switching signal THRM and outputting the selected video signal as the output video signal VOUT for the general picture or the still picture.

In operation, the memory input video signal MVIN from the video memory 9 is delayed by 2 sampling points in the delay 8A and then applied to the first multiplexer 8B. When the color burst phase correcting signal BURST-TOG from the memory address generation means 7 is high, the first multiplexer 8B selects the delayed video signal MVIN' from the delay 8A. This means that the phase of the color burst is inverted by delaying the video signal by 2 sampling points at a sampling period of 4 fsc. In other words, in the odd field, the video signal of odd field is made of the video signal of even field and then outputted.

On the other hand, when the color burst phase correcting signal BURST-TOG from the memory address generation means 7 is low, the first multiplexer 8B selects the memory input video signal MVIN from the video memory 9 and then outputs it directly. Namely, in the even field, the video signal of 263H stored in the video memory 9 is directly outputted.

The video signal from the first multiplexer 8B is then applied to the second multiplexer 8C. When the video switching signal THRM is high, the second multiplexer 8C selects the video signal for the still picture or the output of the first multiplexer 8B and outputs the selected video signal as the output video signal VOUT for the still picture. As a result, the still picture is displayed on the screen. When the video switching signal THRM is low, the second multiplexer 8C selects the input video signal VIN normally played back from the laser disc and outputs the selected video signal as the output video signal VOUT for the general picture. As a result, the normal playback picture is displayed on the screen.

By the way, in the case where the still picture mode is set in the middle of the normal playback of the input video signal VIN, the input video signal VIN is outputted as the memory output video signal MVOUT to the video memory 9 so that it can be processed as the still picture. Subsequently, the input video signal VIN is stored in the location of the video memory 9 corresponding to the write address from the memory address generation means 7.

Therefore, the still picture is selectively outputted and then displayed on the screen of a cathode ray tube (CRT).

As apparent from the above description, according to the present invention, the video signals recorded on the laser discs of the CLV type as well as the CAL type can be displayed as the still pictures. Also, a high quality of the picture can be guaranteed by preventing the picture from being subjected to a damage in scanning the laser disc of the CLV type at high speed. Further, the digital circuitry used herein enables one-chip integration using ASIC.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for processing a still picture in a video laser disc player, comprising:
    a video memory for storing or outputting a video signal of one frame played back from a laser disc in the unit of field every frame in a still picture mode in response to a write or read address signal and control signals;
    field separation means for separating odd and even fields from an external composite synchronization signal and outputting a field signal designating the odd and even fields and a field reference signal designating start points of the odd and even fields in accordance with the separated odd and even fields;

memory store interval control means for outputting a memory store interval control signal in response to the field signal and the field reference signal from said field separation means, an external still picture signal and a signal designating the even field so that an even field portion of a video signal of one frame to be processed as the still picture in the still picture mode can be stored in said video memory;

memory control means responsive to the memory store interval control signal from said memory store interval control means for outputting an address increment signal and a self-horizontal synchronization signal and outputting a chip enable signal, a write/read select signal and a write enable signal as the control signals to said video memory;

memory address generation means for outputting the write or read address signal to said video memory, the even field designating signal to said memory store interval control means and a color burst phase correcting signal in the still picture mode in response to the address increment signal and the self-horizontal synchronization signal from said memory control means; and video signal processing means responsive to the color burst phase correcting signal from said memory address generation means and an external video switching signal for outputting an input video signal of one frame played back from the laser disc directly as an output video signal in a normal mode and, in the still picture mode, outputting the input video signal from the laser disc as a memory output video signal to said video memory, processing an input video signal of one field from said video memory as a video signal of one frame and then outputting the processed video signal as the output video signal.

2. An apparatus for processing a still picture in a video laser disc player, as set forth in claim 1, wherein said field separation means includes:
 a horizontal synchronization signal separation circuit for separating a horizontal synchronization signal from the external composite synchronization signal;
 a vertical synchronization signal separation circuit for separating a vertical synchronization signal from the external composite synchronization signal in response to the separated horizontal synchronization signal from said horizontal synchronization signal separation circuit; and
 a field separation circuit for separating the odd and even fields from the external composite synchronization signal in response to the separated horizontal and vertical synchronization signals from said horizontal and vertical synchronization signal separation circuits and outputting the field signal designating the odd and even fields and the field reference signal designating the start points of the odd and even fields in accordance with the separated result.

3. An apparatus for processing a still picture in a video laser disc player, as set forth in claim 1, wherein said memory store interval control means includes:
 a RS flip-flop for outputting the memory store internal control signal in response to input signals at its set terminal and reset terminal, the memory store interval control signal being enabled in the even field;
 a first OR gate for ORing the memory store interval control signal from said RS flip-flop and the even field designating signal from said memory address generation means and outputting the ORed signal to the set terminal of said RS flip-flop to disable the memory store interval control signal at an end point of a memory store interval;
 an inverter gate for inverting the memory store interval control signal from said RS flip-flop; and
 a second OR gate for ORing the field signal and the field reference signal from said field separation means, the external still picture signal and an output signal from said inverter gate and outputting the ORed signal to the reset terminal of said RS flip-flop to enable the memory store interval control signal at a start point of the memory store interval.

4. An apparatus for processing a still picture in a video laser disc player, as set forth in claim 1, wherein said memory control means includes:
 a 1H address counter for counting addresses of one horizontal scanning line for storing sampled pixels of one horizontal scanning line;
 a 1H counter for counting sampling pulses of one horizontal scanning line and applying its output as the self-horizontal synchronization signal to said memory address generation means;
 a RS flip-flop being reset by an output of said 1H address counter and being set by the output of said 1H counter; and
 a memory control signal output unit being disabled when said RS flip-flop is reset and being enabled when said RS flip-flop is set, said memory control signal output unit being responsive to the memory store interval control signal from said memory store interval control means to output the chip enable signal, the write/read select signal and the write enable signal as the control signals to said video memory and output the address increment signal to an enable terminal of said 1H address counter and said memory address generation means.

5. An apparatus for processing a still picture in a video laser disc player, as set forth in claim 1, wherein said memory address generation means includes:
 a field counter for counting one field in response to the self-horizontal synchronization signal from said memory control means and applying its output as the even field designating signal to said memory store interval control means;
 a first flip-flop for outputting a high signal when the output of said field counter designates the odd field and a low signal when the output of said field counter designates the even field;
 an inverter gate for inverting an output signal from said first flip-flop;
 a first OR gate for ORing an output signal from said inverter gate and the self-horizontal synchronization signal from said memory control means;
 a 253H/262H counter for outputting first and second control signals in response to an output signal from said first OR gate to control a timing of an address counter lead value for making a video signal of odd field of a video signal of even field;
 a first AND gate for ANDing the output signal from said field counter and the first control signal from said 253H/262H counter;

a second flip-flop for outputting the color burst phase correcting signal in response to an output signal from said first AND gate;

a third flip-flop for delaying the second control signal from said 253H/262H counter by 0.5H;

a second OR gate for ORing an output signal from said third flip-flop and the address increment signal from said memory control means;

a 0.5H counter for counting 0.5H in response to an output signal from said second OR gate;

a second AND gate for ANDing an output signal from said 0.5H counter, the first control signal from said 253H/262H counter and the output signal from said field counter;

a third OR gate for ORing an output signal from said second AND gate and the output signal from said inverter gate;

an address counter load value generator for generating the address counter load value in response to an output signal from said third OR gate; and an address counter being enabled by the address increment signal from said memory control means and being loaded by the output signal from said second AND gate to output the write or read address signal in the even or odd field to said video memory in response to the address counter load value from said address counter load value generator.

6. An apparatus for processing a still picture in a video laser disc player, as set forth in claim 1, wherein said video signal processing means includes:

a delay for delaying the memory input video signal from said video memory by 2 sampling points;

a first multiplexer for selecting one of the video signal delayed by said delay and the memory input video signal from said video memory in response to the color burst phase correcting signal from said memory address generation means; and a second multiplexer for selecting an output signal from said first multiplexer and the input video signal normally played back from the laser disc in response to the video switching signal and outputting the selected video signal as the output video signal for the general picture or the still picture.

* * * * *